Figure 1:
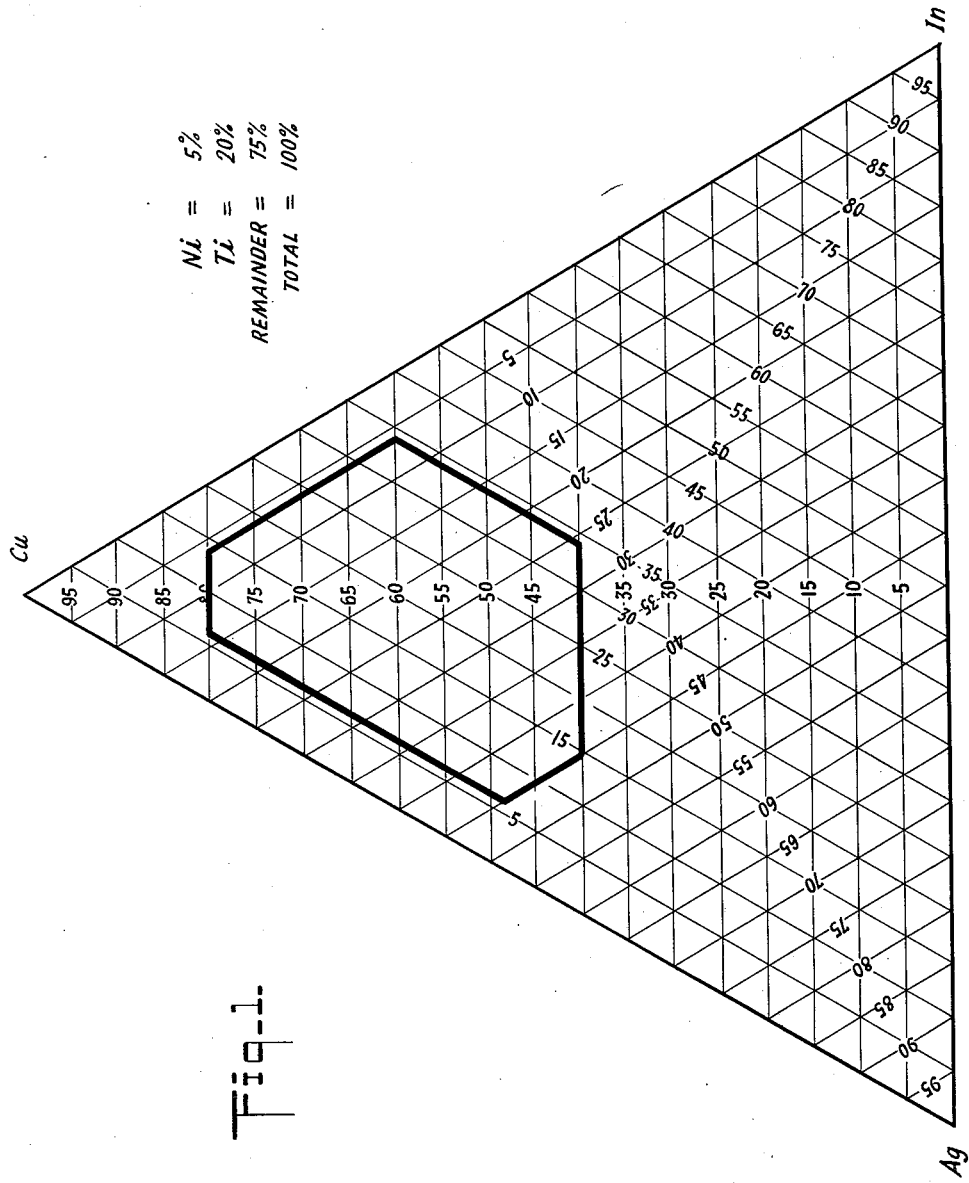

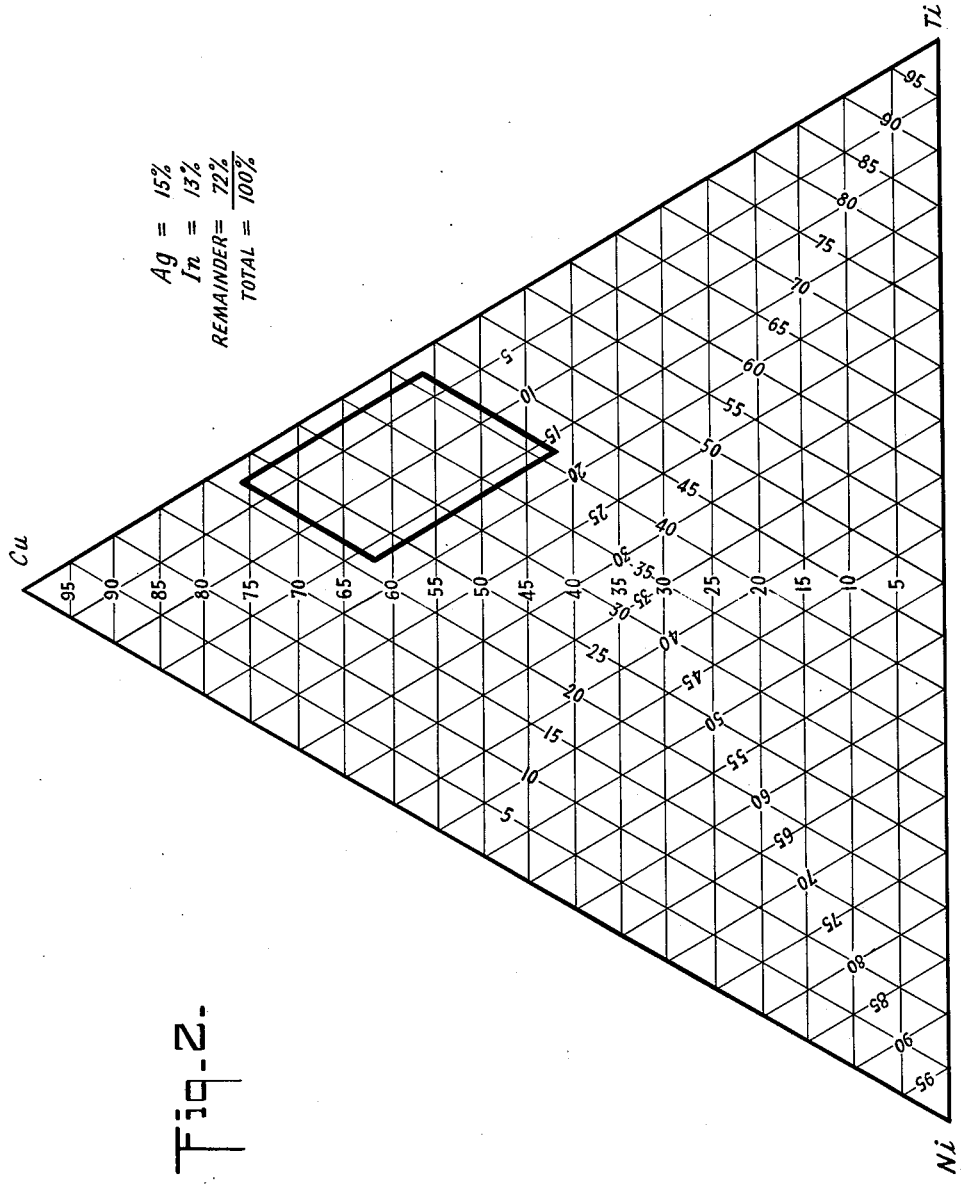

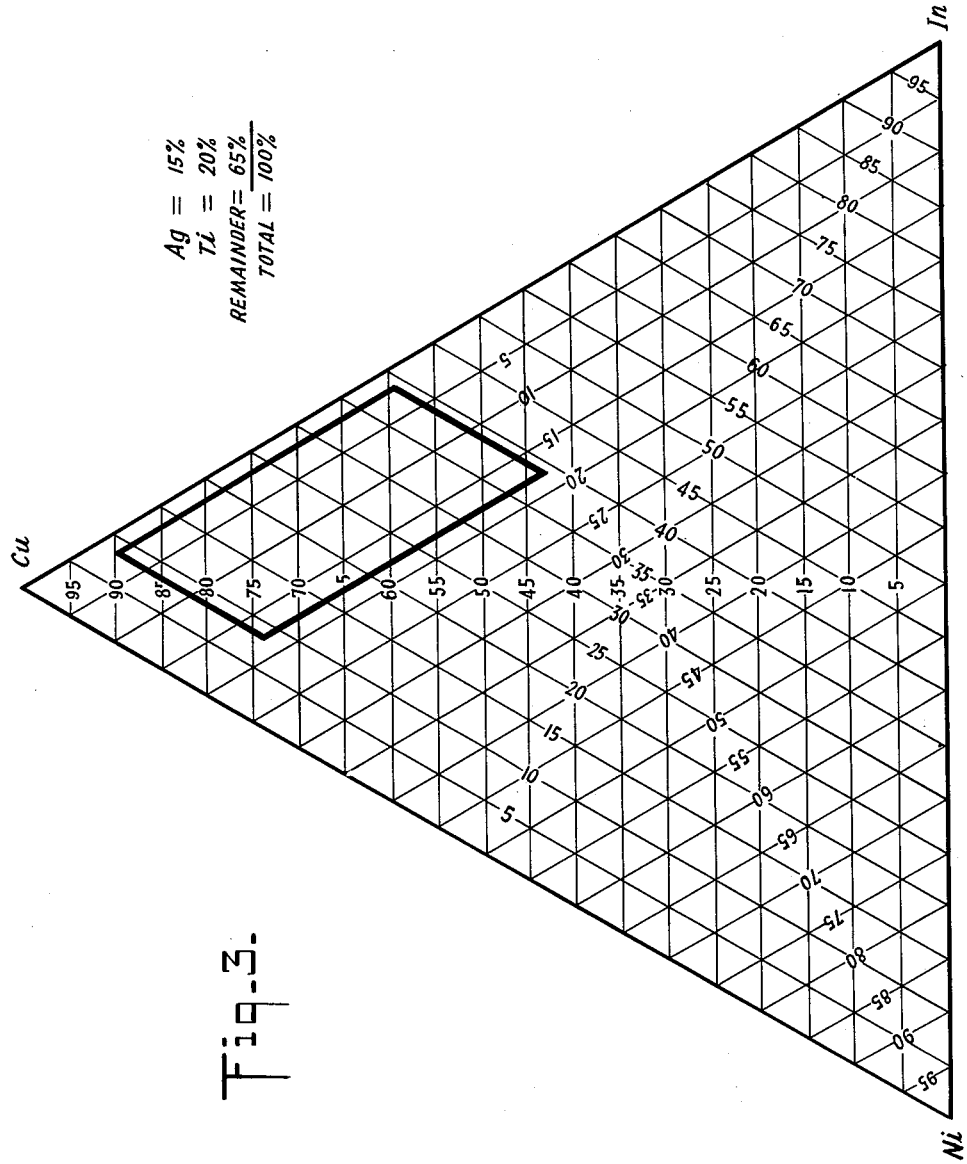

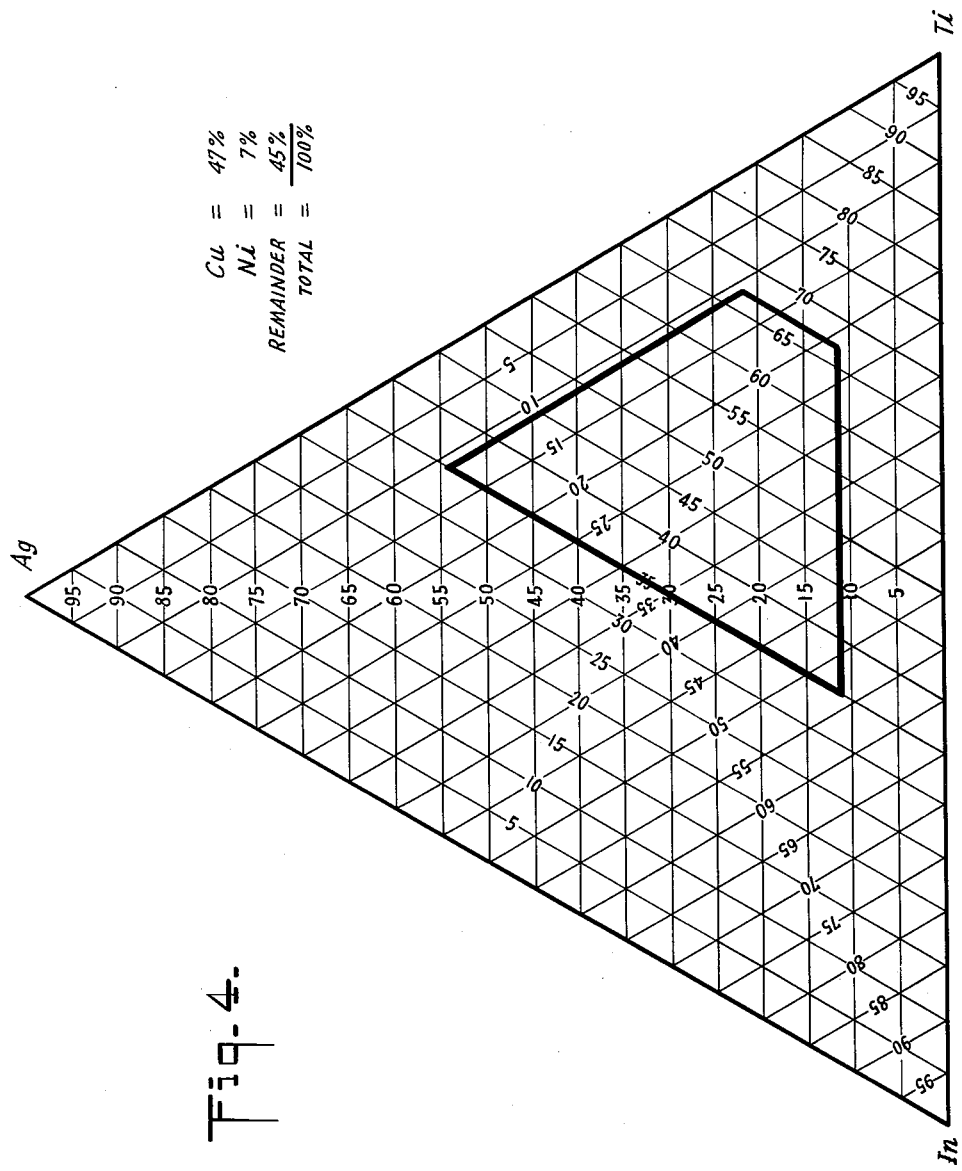

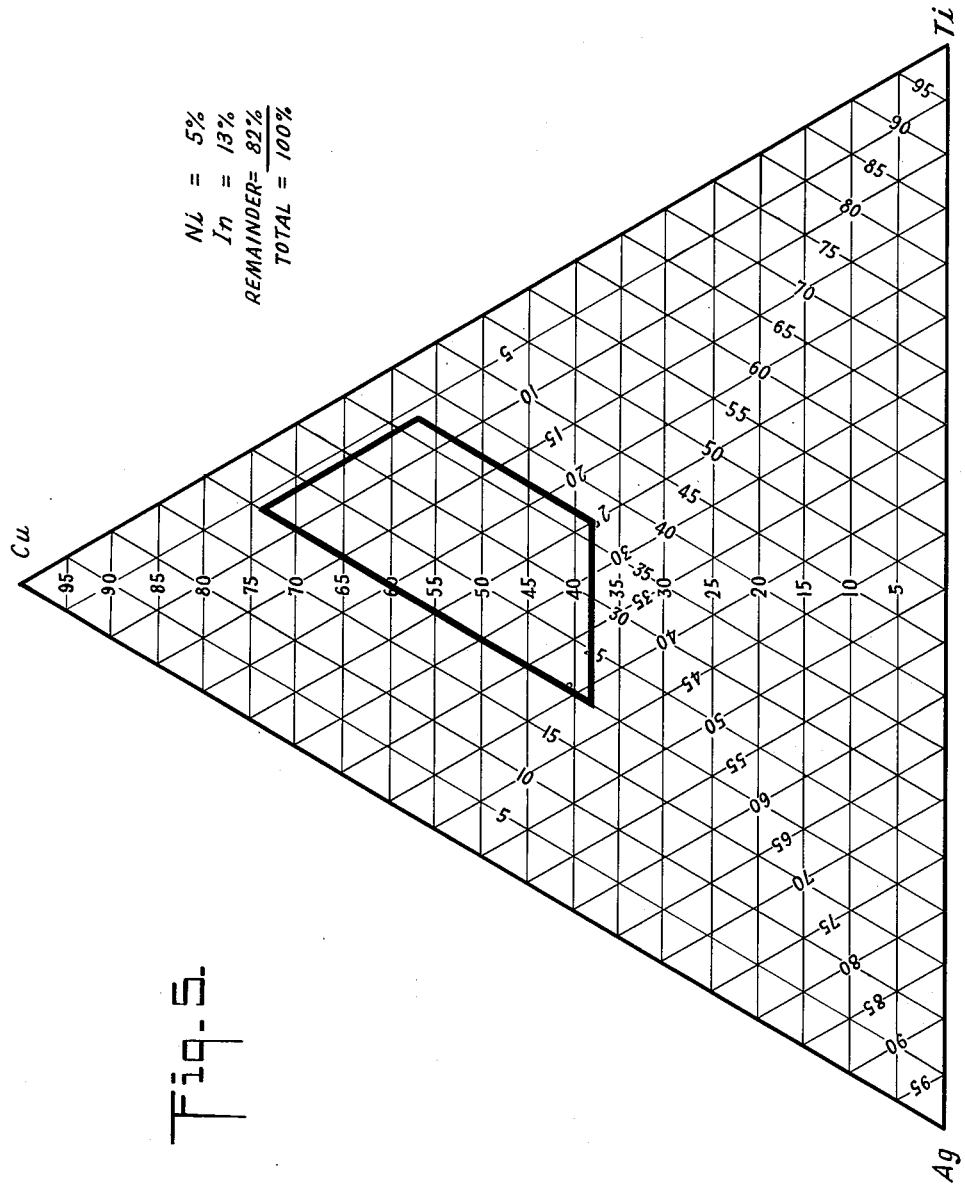

3,034,205
METAL AND CERAMIC BRAZED ARTICLES AND METHOD

Robert G. Ames, Cresskill, N.J., assignor to B.G. Corporation, Ridgefield, N.J., a corporation of New York
Original application Jan. 3, 1958, Ser. No. 707,012, now Patent No. 2,950,189, dated Aug. 23, 1960. Divided and this application Dec. 14, 1959, Ser. No. 677
8 Claims. (Cl. 29—194)

This invention relates to novel brazing compositions as well as to articles which are produced by means of such compositions.

This application is a divisional application of Serial No. 707,012, now Patent No. 2,950,189 and benefit is hereby claimed for the filing date of said application, January 3, 1958.

At present it is known to braze a metal to a ceramic material by means of a titanium-containing alloy. The ingredients and the quantities used are controlled to provide a material having proper flow, melting and bonding characteristics. The percentage of titanium has been kept at a low level in these previous brazing alloys in order to achieve the desirable characteristics mentioned above. It is recognized, however, that titanium is a mechanically strong metal, but to date prior workers have not been able to exploit the excellent properties which might be expected from using titanium in higher concentrations. Using high percentages of titanium was not considered possible, not to mention the complexity of predicting the behavior of the resultant multi-component alloy. The field of brazing could be widened in its application, if it were possible to obtain a brazing alloy of substantially improved mechanical properties. The present invention is concerned with furnishing such a brazing alloy.

An object of this invention is to provide a novel brazing alloy which has unusual mechanical properties, particularly at elevated temperatures, and which also has substantially improved resistance to corrosion.

Another object of this invention is to provide articles of manufacture having incorporated therein brazing material of substantially improved characteristics in regard to mechanical properties and corrosion resistance.

Other objects and advantages of this invention will become apparent from the following description and explanation thereof.

In accordance with the present invention, the novel brazing composition consists essentially of about 30 to 60% copper, about 5 to 35% silver, about 5 to 25% indium, about 1.5 to 12% nickel and about 15.5 to 30% titanium, based on the total weight of the composition. The relative concentrations of the ingredients are correlated in the manner given in FIGS. 1 to 5, inclusive, in the accompanying drawings.

The alloy ingredients are correlated to obtain a composition which is at or substantially at a eutectic point, otherwise the alloy will undergo differential melting or produce a sinter and be unsuitable for the purposes of this invention. In the development work leading to the present invention, the production of a satisfactory brazing alloy containing a high percentage of titanium was unexpected because numerous failures were encountered prior to the first successful test. At the titanium concentrations being claimed herein it was found that without the presence of indium the brazing alloy was not satisfactory, because it had an unacceptable flowability characteristic. Now, we find that with the indium, the brazing alloy wets the bodies being brazed, whether ceramic or metal, equally, and thus to a substantial extent eliminates the need for "stop offs," i.e. materials which diminish the wetability of the braze for the body to be brazed.

Satisfactory flowability was not achieved until the quantity of indium was correlated in the manner shown in the accompanying drawings and as described hereinabove. In addition to providing excellent flowability characteristics, the indium serves to prevent the titanium from reacting with nitrogen, hydrogen, oxygen, etc. at the elevated temperatures of alloying or in reaching the brazing temperature. The products from titanium and such materials adversely influence the properties of the alloy and so are to be avoided.

Titanium is a mechanically strong element and its presence in the brazing alloy imparts desirable mechanical properties. It was never appreciated that an alloy containing at least 15.5% titanium could have the desired wetting, melting and flow characteristics required of a brazing material. However, when the concentration of titanium exceeds 30%, the resultant alloy contains partial sinter, indicating that too much titanium is present as far as a workable alloy is concerned. In other words, the alloy must contain about 15.5 to 30% titanium at the concentrations of the other ingredients otherwise the alloy is not workable as a brazing material.

The presence of nickel in the alloy imparts excellent corrosion resistance and it enhances the mechanical properties of titanium. Nickel has an extremely high melting point, and the manner in which it is employed in the alloy must be controlled carefully, otherwise an alloy having suitable melting characteristics is not obtained. Nickel cooperates with titanium to give an alloy having greater mechanical strength and corrosion resistance than might be expected on the basis of the individual metals. The quantity of nickel must be controlled to within 1.5 to 12% by weight based on the total composition, otherwise the alloy would undergo differential melting or contain partial sinter.

The elements, silver and copper, act mainly as vehicles or fillers; however, their concentrations must be controlled carefully in order that the composition can be at a eutectic point or in the pateau of one. Their presence is necessary and desirable for satisfactory results. For some unexplainable reason, one metal cannot be substituted for the other, and this is surprising since they are both known as soldering metals and considered to be equivalent by skilled persons.

In the preparation of the brazing alloy, titanium may be partly or wholly replaced with either zirconium or hafnium. Likewise, in the case of the vehicle or filler, the element gold may either partly or wholly replace either copper or silver. As to indium, it can be partly or wholly replaced by bismuth, tin, lead or antimony. While the results achieved by these substitutions may be satisfactory, the elements titanium, copper, silver, indium and nickel provide by far the best results. In other words, the results obtained by means of titanium, silver, copper, indium and nickel are vastly superior to those which may be obtained from the named substitution elements.

An outstanding characteristic of the alloy of this invention is that it is excellent in brazing stainless steels. Those skilled in the art will appreciate that stainless steels are very difficult to braze and that any material which can perform this result has solved a serious problem in this field. The brazing alloy can also be used for joining either a metal to another metal body or to a ceramic body. For example, our brazing alloy can be used in joining Inconel to Inconel, stainless steel to stainless steel or any metal to a ceramic material such as, for example, alumina, forsterite, zircon, electrical porcelain, etc., or, in particular, a ceramic metal oxide. The present brazing alloy can be used to join any metal to another metal or a metal to a ceramic body.

Another outstanding advantage of the present invention is that our brazing alloy permits wide latitude in the type of gaseous atmosphere which may be present during the heating step. In conventional practices it is important to maintain either a vacuum or a hydrogen atmosphere during the sintering or heating step of the operation. In the present case an atmosphere of cracked ammonia gas may be employed without having any serious effect on the quality of the resultant braze. The cracked ammonia gas contains nitrogen, but this does not interfere because indium in the alloy shields the titanium to the extent that no significant reaction between nitrogen and titanium occurs. Our alloy also lends itself to a single firing operation, and thus a conveyor furnace system can be used for the brazing treatment. In conventional practices it is customary to employ a multi-firing, which means that the bodies to be bonded are heated in at least two separate steps to elevated temperatures. This is a costly operation, not to mention the possible defects which may arise from twice heating the materials to elevated temperatures.

To prepare for the brazing treatment the metal or ceramic body, whichever is the case, is cleaned to lessen the chance of obtaining poor bonding. In the case of the metal, it may be degreased by the use of trichlorethylene. When stainless steel is the metal body, it may be optionally passivated by treatment with a 5 to 10% aqueous solution of nitric acid. Such passivation tends to prevent discoloration of stainless steel. A ceramic body on the other hand, may be washed with an aqueous solution of detergent. Ordinary soap is suitable for this purpose. In prior practices, stainless steel was not passivated because it presented enough difficulties from a brazing point of view that prior workers did not want to complicate matters further. In the present invention passivated stainless steel can be brazed just as effectively as an unpassivated stainless steel, thus pointing to the unique properties of our brazing composition.

The body to be brazed may be in any desired shape or form. For example, the bodies may be in the shape of plates, cylinders, rods or the like, just so long as the surfaces to be bonded can be properly placed in a face-to-face relationship. Likewise, the brazing composition may be in any shape or form, just so long as it also can be placed in intimate contact with the surfaces to be joined. Ordinarily the ingredients of the brazing composition are in finely divided or powder form and these powders can be admixed in suitable proportions and compacted into the desired shape. The compacting is accomplished by subjecting the powder, which may be placed within a die, to a pressure of about 2000 to 6000 p.s.i.g. The usual shapes of the compacted brazing alloy are rings, discs, etc.

The bodies to be joined and the brazing alloy or the braze assembly are placed in a suitable furnace and heated to a temperature of about 1800 to 2200° F. Higher temperatures may be used but these may not be practical for economical reasons. The assembly being treated may be subjected to the elevated temperatures for a period of at least 5 minutes and it can remain at the elevated temperature for an indefinite period of time, but ordinarily 15 minutes is a satisfactory upper limit. When relatively lower brazing temperatures are used it is preferred to use a longer period of treatment in order to insure proper bonding.

In order to provide a better understanding of the present invention, reference will be had to specific examples and the accompanying drawings which form a part of this specification.

In the numerous experiments which were performed, in order to obtain the correlations shown in FIGS. 1–5, inclusive, the alloying ingredients were initially present in the form of powders. The metal powders were admixed in suitable proportions in a mill and then they were compacted into a ring for brazing a stainless steel flange to an alumina cylinder. This procedure could have been varied by forming the brazing alloy into a wire for use in the brazing operation. In the brazing step, the assembly was heated to a temperature of 2000° F. for a period of 10 minutes. A conveyorized furnace was used in the experiments with cracked ammonia gas as the blanketing atmosphere. By virtue of the furnace construction, after the samples were heated for 10 minutes they were allowed to cool over a period of about 20 to 30 minutes to a temperature of about 180° F.

In accordance with the procedure just described, sufficient alloys were prepared and tested to obtain the correlation shown in FIGS. 1–5, inclusive. When the concentration of ingredients fell outside of the enclosed area in these figures the alloy was undesirable because it had poor flowability, partially sintered or underwent differential melting.

The following are illustrative alloy compositions which showed good properties from the standpoint of flowability, mechanical strength and resistance to corrosion:

*Table I*

| Alloy No. | 549 | 550 | 551 | 552 | 553 | 554 | 555 |
| --- | --- | --- | --- | --- | --- | --- | --- |
| Copper | 60 | 54.5 | 30 | 34 | 47 | 53 | 48 |
| Silver | 7.5 | 15 | 15 | 33.5 | 24 | 5 | 7.5 |
| Indium | 7.5 | 13 | 24.5 | 7.5 | 5 | 13 | 7.5 |
| Nickel | 5.0 | 1.5 | 10.5 | 5.0 | 7 | 5 | 7.0 |
| Titanium | 20.0 | 16 | 20.0 | 20.0 | 16 | 24 | 30.0 |
|  | 100.0 | 100.0 | 100.0 | 100.0 | 100.0 | 100.0 | 100.0 |

The following are examples of exceptional brazing alloys, from the standpoint of flow and wetting characteristics and mechanical properties.

*Table II*

| Alloy No. | 459 | 473 | 440 | 448 | 458 |
| --- | --- | --- | --- | --- | --- |
| Copper | 55 | 38.5 | 51 | 51 | 51 |
| Silver | 15 | 15 | 17 | 18.5 | 15.5 |
| Indium | 6.5 | 23 | 10.2 | 9.25 | 11.0 |
| Nickel | 3.5 | 3.5 | 1.6 | 3.0 | 3.2 |
| Titanium | 20 | 20 | 20.2 | 18.5 | 19.5 |

To illustrate the excellent mechanical properties of my alloys, a comparison is given below.

The conventional alloy used in the comparison contained 5% by weight titanium. It was compared with alloy No. 448. The conventional alloy is designated as alloy "A."

*Table III*

| Alloy No. | A | 448 |
| --- | --- | --- |
| Combined Tensile and Shear Strength, p.s.i.g.[1] | 6,900 | 11,400 |

[1] Performed on a Dillon Dynamometer Tensile Tester.

The data in Table III shows clearly the exceptional mechanical properties of my new alloy as compared to a conventional one.

I claim:
1. An article of manufacture comprising two stainless steel bodies being joined by a brazing alloy consisting essentially of about 30 to 60% copper, about 5 to 35% silver, about 5 to 25% indium, about 1.5 to 12% nickel and about 15.5 to 30% titanium, said ingredients being correlated as shown in FIGURES 1–5, inclusive, of the accompanying drawings.

2. An article of manufacture comprising a metal body and a ceramic body being joined by a brazing alloy consisting essentially of about 30 to 60% copper, about 5 to 35% silver, about 5 to 25% indium, about 1.5 to 12% nickel and about 15.5 to 30% titanium, said ingredients being correlated as shown in FIGURES 1–5, inclusive, of the accompanying drawings.

3. An article of manufacture comprising a stainless steel body and a ceramic body being joined by a brazing alloy consisting essentially of about 30 to 60% copper, about 5 to 35% silver, about 5 to 25% indium, about 1.5 to 12% nickel and about 15.5 to 30% titanium, said ingredients being correlated as shown in FIGURES 1-5, inclusive, of the accompanying drawings.

4. An article of manufacture comprising a stainless steel body being joined to an alumina body by a brazing alloy consisting essentially of about 30 to 60% copper, about 5 to 35% silver, about 5 to 25% indium, about 1.5 to 12% nickel and about 15.5 to 30% titanium, said ingredients being correlated as shown in FIGURES 1-5, inclusive, of the accompanying drawings.

5. The method of brazing one body to another which comprises placing the bodies in face-to-face relationship and interposing therebetween an alloy consisting essentially of about 30 to 60% copper, about 5 to 35% silver, about 5 to 25% indium, about 1.5 to 12% nickel and about 15.5 to 30% titanium, said ingredients being correlated as shown in FIGURES 1-5, inclusive, of the accompanying drawings, brazing the resultant assembly at a temperature of about 1800° to 2200° F. and for a period of at least about 5 minutes.

6. The method of brazing a stainless steel body to a body selected from the group of stainless steel and a ceramic which comprises placing the bodies in face-to-face relationship and interposing therebetween an alloy consisting essentially of about 30 to 60% copper, about 5 to 30% silver, about 5 to 25% indium, about 1.5 to 12% nickel and about 15.5 to 30% titanium, said ingredients being correlated as shown in FIGURES 1-5, inclusive, of the accompanying drawings, brazing the resultant assembly at a temperature of about 1800° to 2200° F. in a cracked ammonia gas atmosphere and for a period of at least about 5 minutes.

7. The method of brazing a stainless steel body to another body composed of the material selected from the group consisting of stainless steel and a ceramic which comprises placing the bodies in face-to-face relationship and interposing therebetween in intimate contact an alloy consisting essentially of about 30 to 60% copper, about 5 to 35% silver, about 5 to 25% indium, about 1.5 to 12% nickel and about 15.5 to 30% titanium, said ingredients being correlated as shown in FIGURES 1-5, inclusive, of the accompanying drawings, brazing the resultant assembly in a single step at a temperature of about 1800° to 2200° F. in a cracked ammonia gas atmosphere and for a period of about 5 to 15 minutes.

8. The method of claim 7 wherein the assembly is placed in a conveyorized furnace and after heating it is allowed to cool for a period of about 20 to 30 minutes to a temperature in the order of about 180° F.

References Cited in the file of this patent

UNITED STATES PATENTS

| | | |
|---|---|---|
| 1,848,786 | Lampart | Mar. 8, 1932 |
| 2,480,711 | Calton | Aug. 30, 1949 |
| 2,793,423 | Stumbock | May 28, 1957 |
| 2,834,098 | Pease | May 13, 1958 |
| 2,917,140 | Omley | Dec. 15, 1959 |